May 14, 1929.    J. J. DUFFIE    1,713,218
CHECK PRINTING MACHINE
Filed March 2, 1925    7 Sheets-Sheet 5
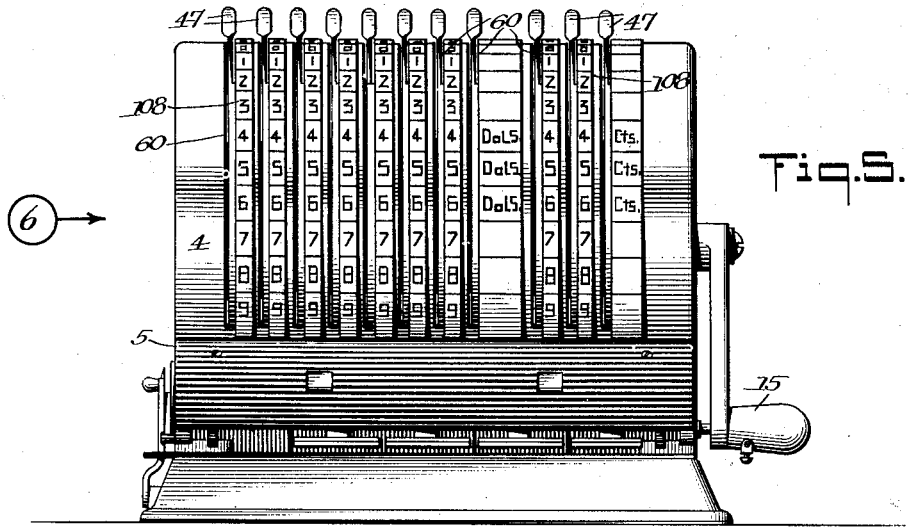
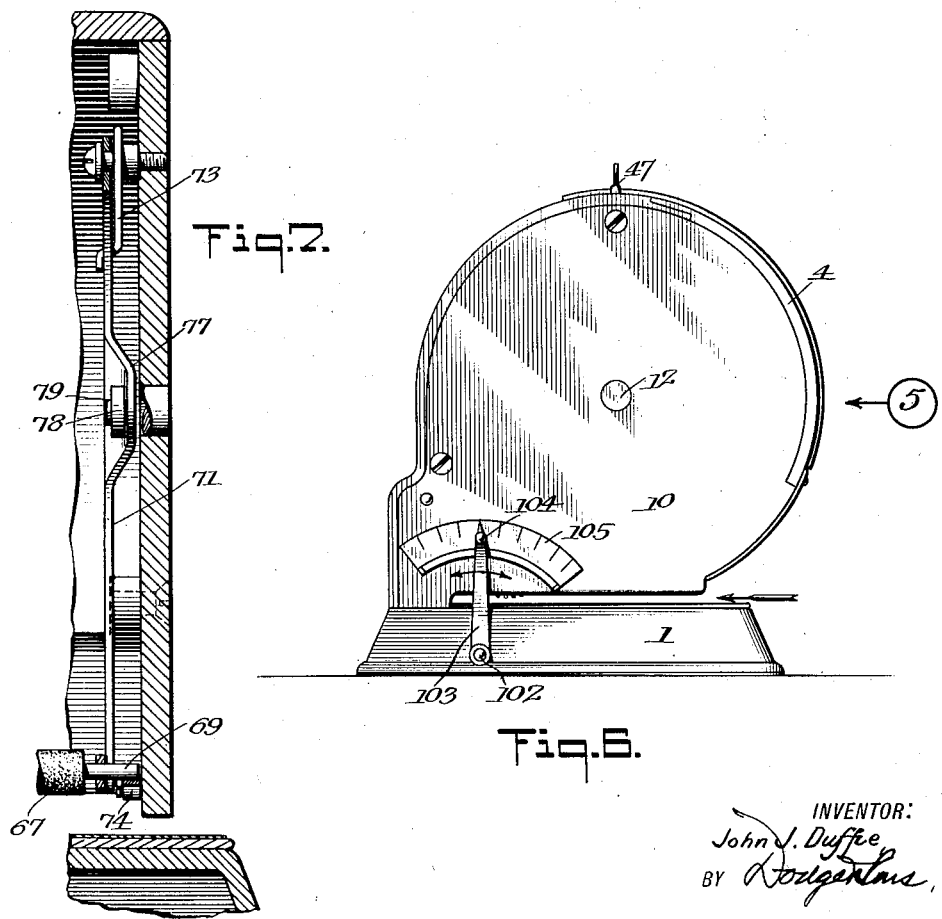
INVENTOR:
John J. Duffie
BY Rodgers Lane
ATTORNEYS.

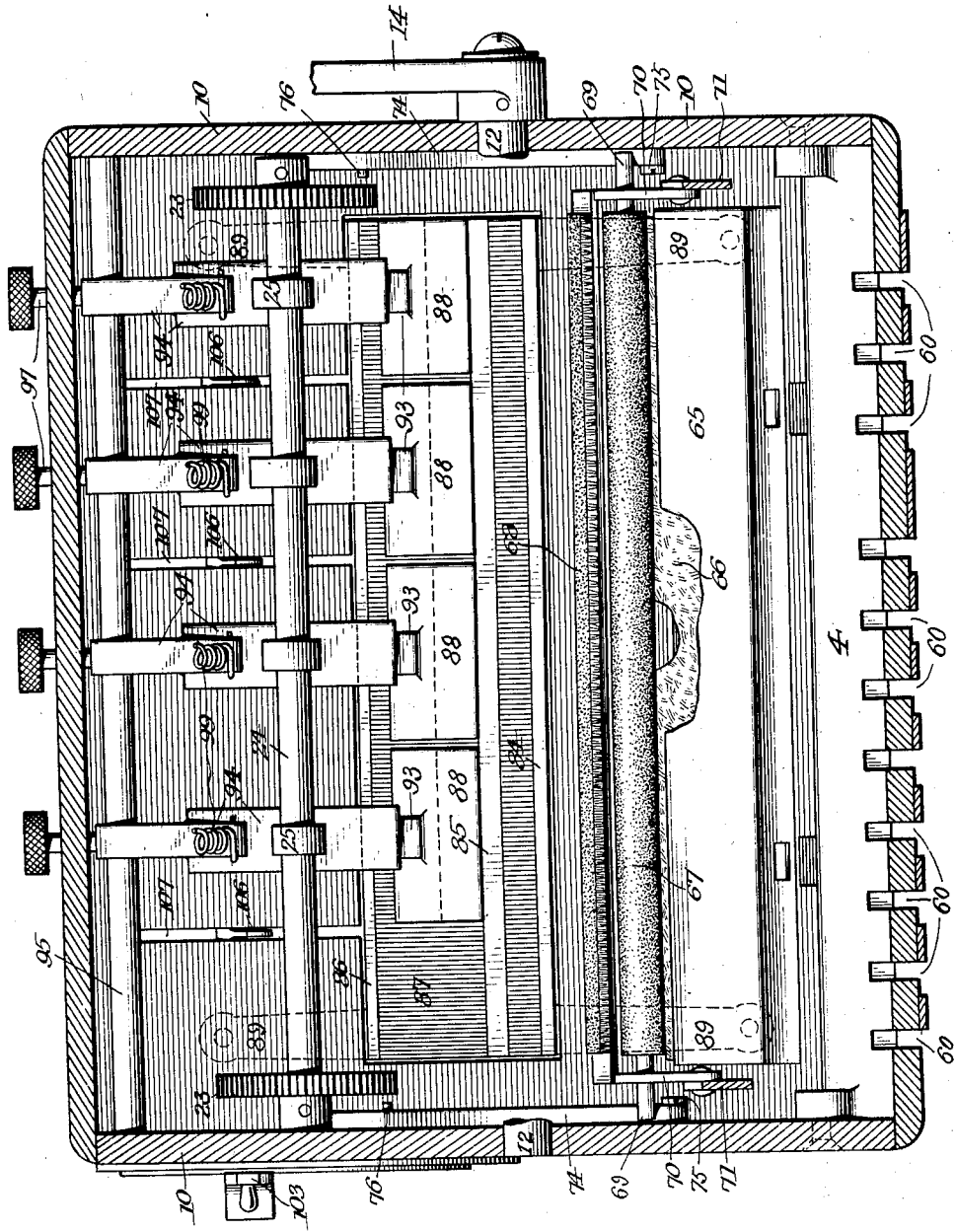

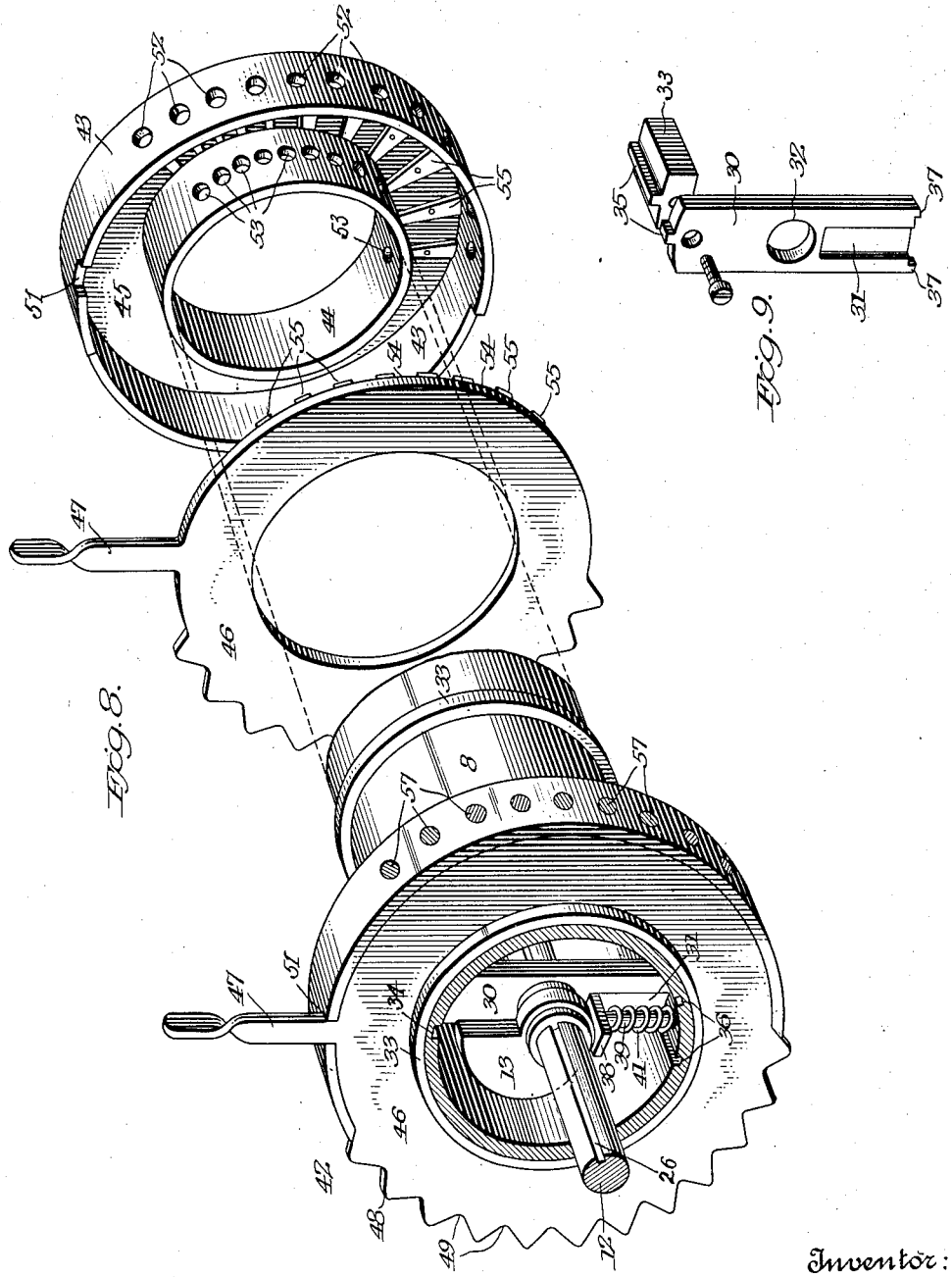

May 14, 1929.  J. J. DUFFIE  1,713,218
CHECK PRINTING MACHINE
Filed March 2, 1925     7 Sheets-Sheet 7
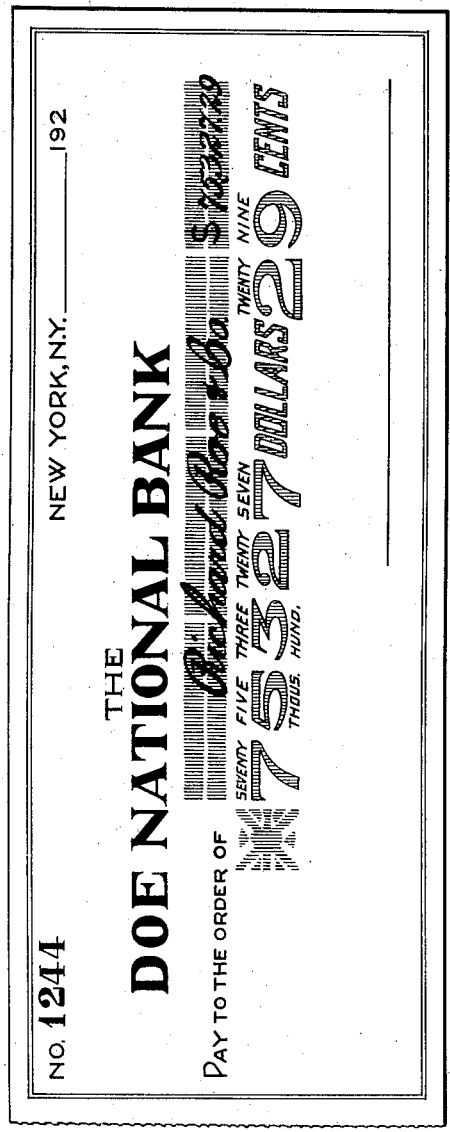
INVENTOR:
John J. Duffie,
BY
ATTORNEYS.

Patented May 14, 1929.

1,713,218

UNITED STATES PATENT OFFICE.

JOHN J. DUFFIE, OF NEW YORK, N. Y.

CHECK-PRINTING MACHINE.

Application filed March 2, 1925. Serial No. 12,584.

This invention pertains to check-printing mechanism, and has for its primary object the prevention of any alteration or raising of the printed check without leaving such clear and obvious evidence of the alteration as will preclude its acceptance or payment by anyone of ordinary intelligence. Incidental to this main purpose is the designation of the amount of the check by figures or numerals, each accompanied by its name, printed in large type, and the cents, dollars, hundreds and thousands of dollars, or higher values, likewise indicated in connection with the figures or numerals representing such values in the printed line.

Finally, simplicity of construction and operation, and durability of all parts of the mechanism, are carefully kept in view and ensured.

Figure 1:
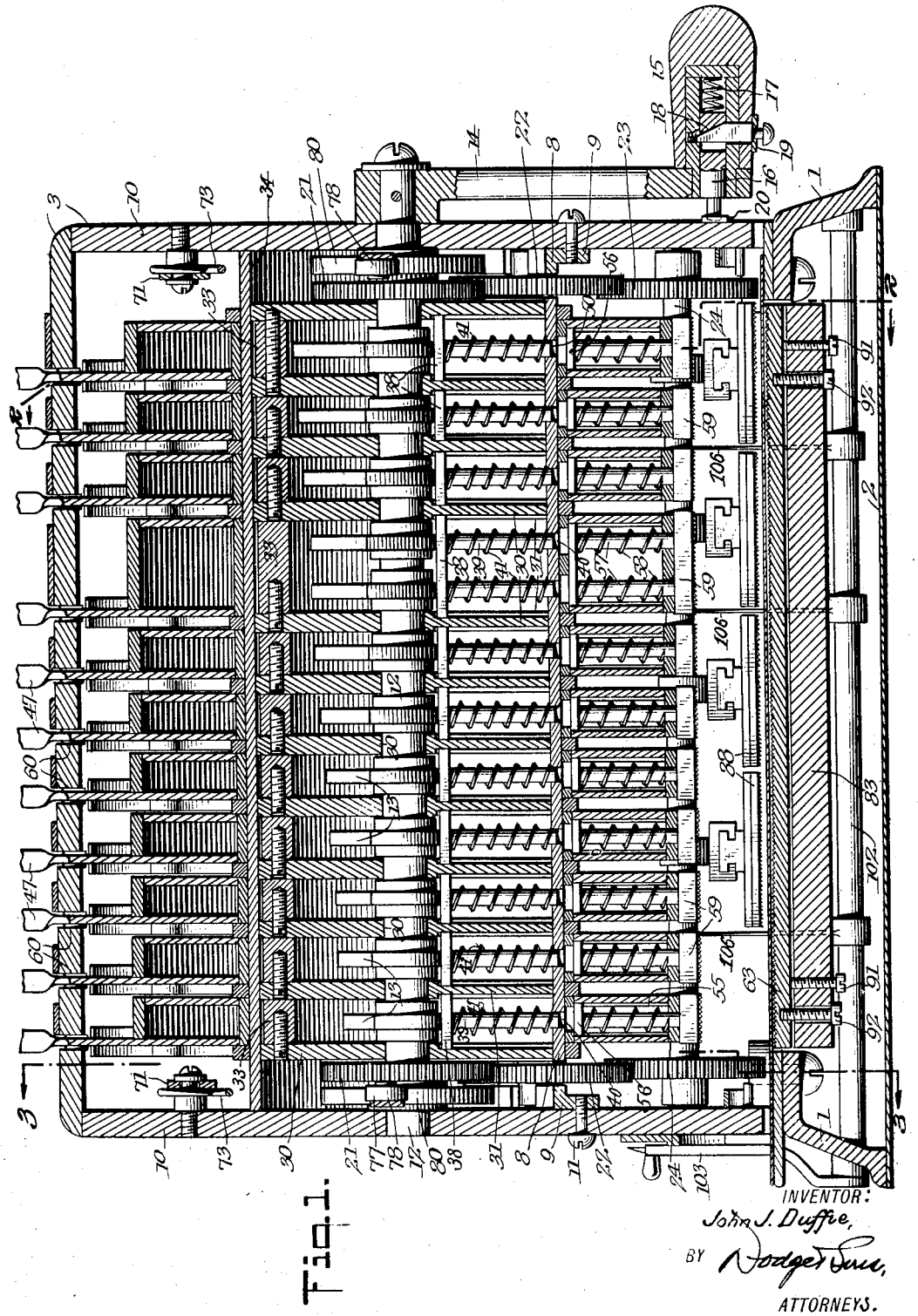
Figure 2:
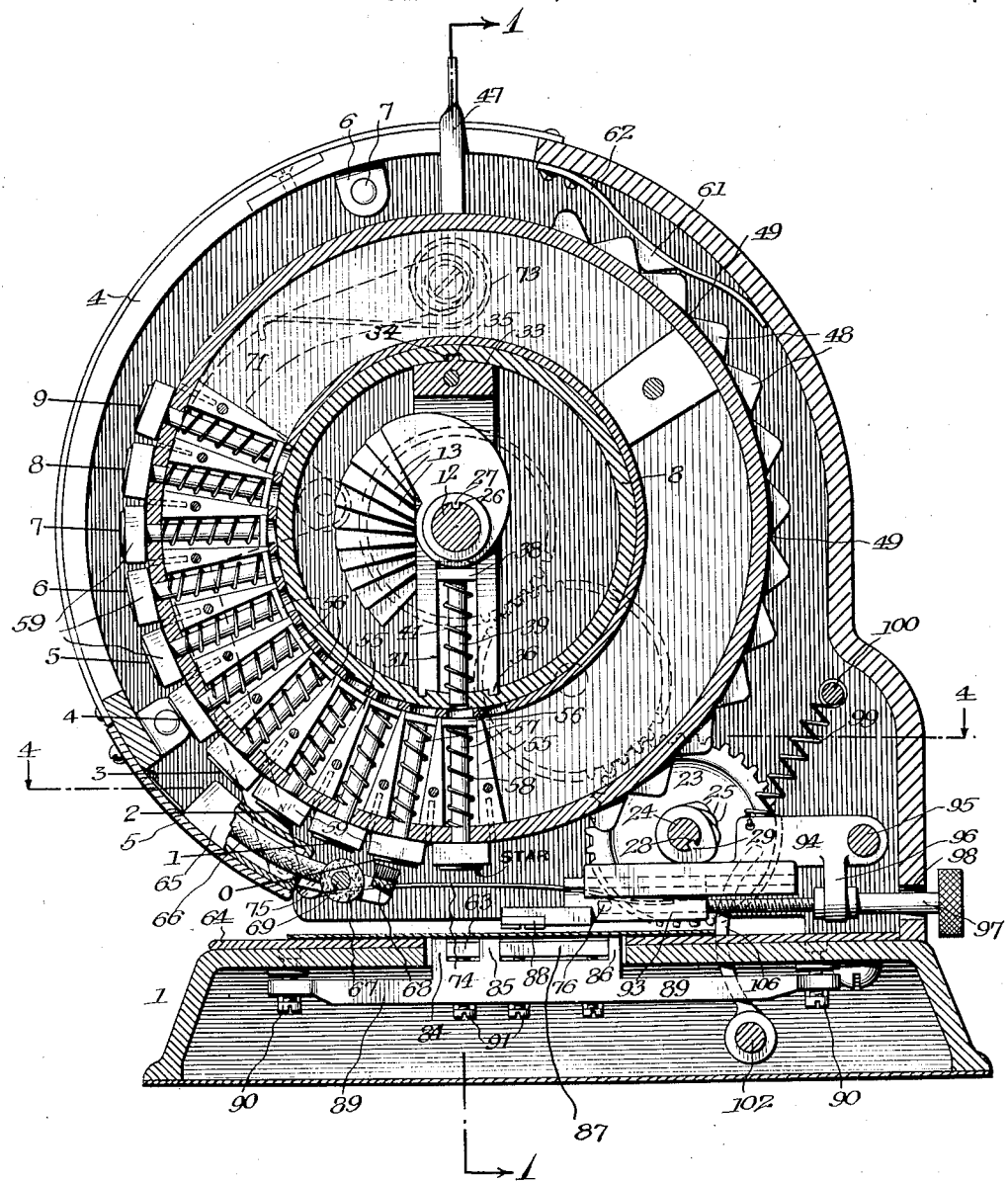
Figure 3:
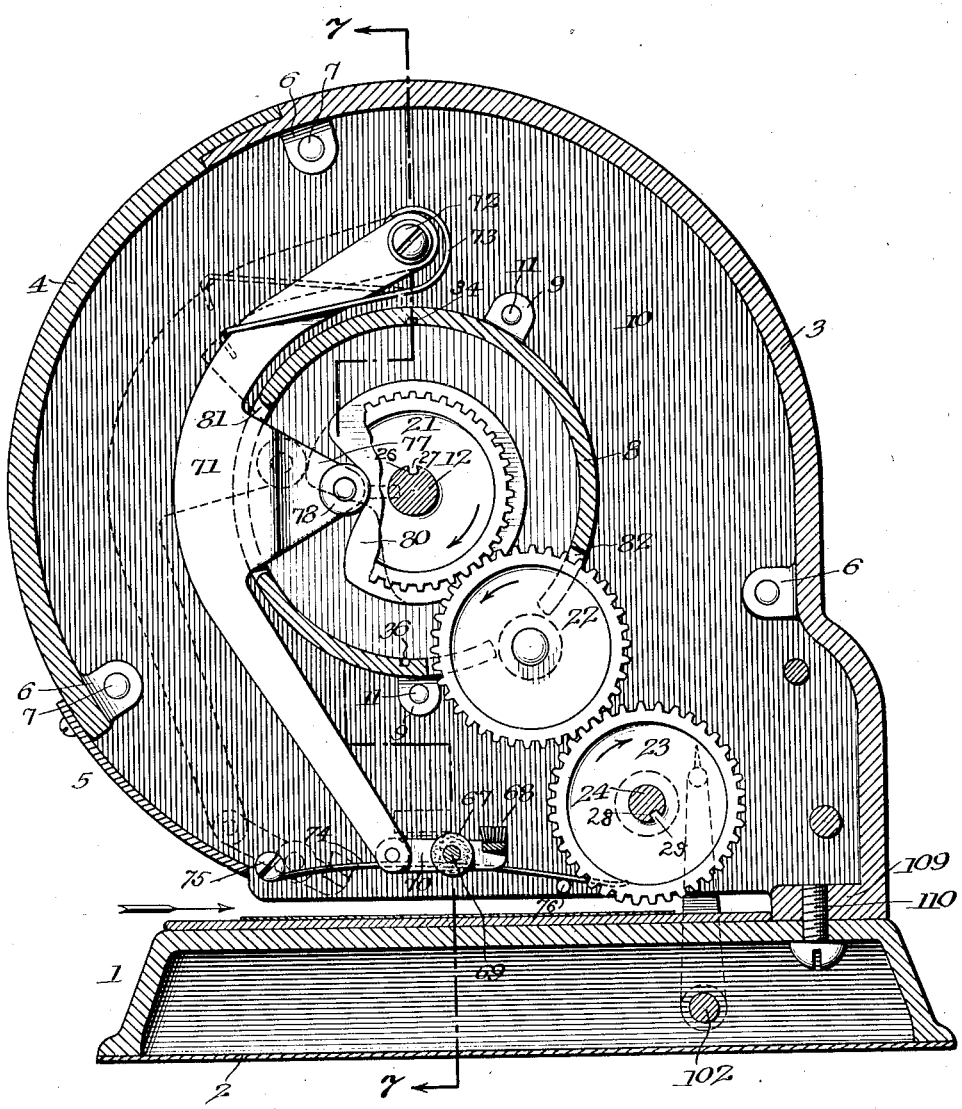

The improved machine is illustrated in the accompanying drawings, wherein:

Figure 1 is a longitudinal, vertical, sectional view, taken on the line 1—1 of Fig. 2, and looking in the direction of the arrows or toward the rear of the machine, but showing the main shaft and its cams and the stems actuated thereby in full or complete form;

Fig. 2, a vertical section on the plane indicated by the line 2—2 of Fig. 1, looking in the direction of the arrows shown thereon;

Fig. 3, a similar section on the line 3—3 of Fig. 1, looking in the direction indicated by arrows in said Fig. 1;

Fig. 4, a horizontal section on the line 4—4 of Fig. 2, looking downward;

Fig. 5, a front elevation of the assembled machine, looking in the direction of the arrow, Fig. 6;

Fig. 6, a left end elevation of the machine, looking in the direction indicated by arrow in Fig. 5;

Fig. 7, a fragmentary vertical section on the line 7—7 of Fig. 3, looking in the direction indicated by arrows in said figure;

Fig. 8, a fragmentary perspective view showing some of the parts separated to make plain their form and construction;

Fig. 9, a perspective view of one of the plunger or stem guide members;

Fig. 10, a face view of a check printed in accordance with my invention and by the machine shown.

For the purpose of preventing successful alteration or raising of checks, either as to the name of the payee or as to the amount indicated, it is a common practice to produce incisions or punctures in those portions of the check upon which the name of the payee and the amount of the check are written, the theory being that the surface will thus be roughened, and more or less ragged edges of the paper will be presented to the pen, causing difficulty in writing or printing, and absorption of the ink by the edges of the cuts or perforations, with a consequent and noticeable blurring of the newly written or printed matters. Owing, however, to the relatively small size of the slits or punctures, and to a natural tendency of rough or torn edges of paper to felt together under rubbing or manipulation, such protection is slight in many cases, and the legibility of writing or printing is much impaired by the subsequent slitting or puncturing.

To overcome this effect, and secure the highest practicable degree of legibility consistent with protection against alteration, I substitute printing for the usual writing indicating the amount of the check, and I employ type of very large size for the digits making up the printed amount. This, in addition to giving greater legibility in itself, permits slitting, puncturing, or roughening the printed surface without impairing legibility in any serious degree, and necessitates the treatment of a much greater extent of surface preparatory to attempting alteration of the printed designation of the amount to be paid than under former practice.

Further to insure legibility and certainty of correct reading, the name of each digit is printed close to it, preferably directly above it, and finally, the word "Cents" is printed after the two spaces assigned to cents; the word "Dollars" is printed after the space assigned to dollars; the word "Hundred" or an abbreviation thereof is printed close to and preferably immediately below the first digit of the three occupying the hundreds space; the word "Thousand" or an abbreviation thereof is printed in close association with the last digit printed in the thousands space; and so of higher denominations if the machine carry type therefor. To guard against any figure or other matter being placed in advance of the check after it is originally printed, a special type is provided for use at that point, whatever be the sum printed, a simulation of a Maltese cross being here illustrated. Provision is made for scoring, slitting, or puncturing those portions of the check in which the name of the payee and the usual figure designation of the amount are written, as well as the matter printed by the machine.

Referring now to the drawings and to the numerals thereon, 1 indicates a base or bed having depending walls or flanges on sides and ends, thus forming an enclosed space beneath the bed proper, within which space are located parts of the mechanism, as later pointed out. The bottom of the hollow base is preferably closed by a plate 2 of metal or other suitable material, to protect the contained parts against dust and injury. Preferably cast with, but if desired resting upon and secured to the base 1, is a shell or casing 3 of substantially cylindrical form with its axis horizontal. This casing serves both as a main supporting frame for the mechanism, and as an enclosing and protecting casing therefor, bearings being formed in the end walls 10 of the casing and of the base for certain shafts later referred to. Other parts are also carried by the end walls of the casing. These end walls 10 are here shown made separate from the cylindrical body or intermediate portion, which in such case overlaps or encompasses and is secured to said walls by screws or other suitable fastenings. A front section 4 of the cylindrical body of the casing is made removable to facilitate assembling and disassembling of the contained mechanism, and the closure of front is completed by a curved metal plate 5, the body 3 and removable section 4 being formed with perforate ears 6 to receive fastening screws 7 by which the cylindrical body and removable section are united with the end plates or walls 10. These end walls are further connected by a hollow cylinder 8 provided with ears 9, and attached to said end plates or walls 10 by screws 11, as shown in Figs. 1 and 3.

Extending through and concentric with the hollow cylinder 8 and journaled in the end walls 10 of the casing 3, is a main cam-shaft 12 upon which are keyed or otherwise secured against movement independently of or relatively to shaft 12, a series of cams 13 of like form and dimensions but arranged in spiral order, or in uniformly varying angular relation to the shaft, as best shown in Fig. 2. The right-hand end of shaft 12 is extended beyond the end wall 10, and has secured to it a crank-arm 14 provided with a handle 15 by which to turn the shaft clockwise through 360 degrees, or from its normal position through one complete rotation, thereby bringing arm 14 and handle 15 again to their normal positions in which they are shown in Figs. 1 and 5. The handle 15 is provided with an axially sliding bolt 16, one end of which protrudes from said handle and is pressed outward therefrom toward the proximate end wall 10 of the casing 3 by a helical spring 17 placed between the inner end of the bolt and the end wall of the socket in which the bolt 16 is seated and guided. Passing through an opening formed in the bolt 16 is a wedge-block 18, the inner end of which bears against a small helical spring tending to force the wedge-block outward. The outward movement of block 18 is limited by a metal retaining-plate 19, through which passes a reduced stem of the bolt, preferably furnished with a knob or rounded head. The spring 17 serves to press bolt 16 into a seat or socket 20 formed in the end wall 10, or in a metal plate secured thereto. The bolt 16 serves to hold crank-arm 14 in its normal or lowermost position while the necessary type are being set up in line for printing, but being retracted by pressure of the fingers in grasping the handle 15, frees the crank-arm for the movement necessary for rotating shaft 12. This locking of said shaft, though not essential, is quite desirable as it prevents premature or accidental actuation of the type-carrying stems and other parts later described.

The main cam-shaft 12 carries near each end a gear wheel 21 made fast to the shaft, and meshing with an idler pinion 22 carried upon a stud-axle secured to the proximate end wall 10 of the casing, the idlers meshing with and giving rotary motion to a third pair of gear-wheels 23, made fast upon and near the ends of a secondary cam-shaft 24 journaled in the end walls of the casing, as seen in Figs. 1, 3 and 4. By this arrangement the secondary cam-shaft 24 is caused to turn in unison with the main cam-shaft 12, and in the same direction. The secondary cam-shaft carries a series of cams 25, of the same general form as the cams 13 of the main shaft 12, but smaller. Shaft 12 is provided with a keyway or groove 26 to receive a tooth 27 of each cam 13, and shaft 24 is similarly provided with a groove or keyway 28 to receive a like tooth 29 of its cams 25, each cam of both series having such a tooth projecting inwardly from the bore of its hub, as seen in Fig. 2. The hubs of cams 13 project beyond the side faces of the cam, as shown in Fig. 1, and there is hence between each hub and the one next, a space or circumferential groove.

These inter-hub spaces or grooves receive the mid-length portion of vertical guide members 30 of the form best shown in Fig. 9, it being understood that the lower half of each side face of said members is provided with a vertical guideway 31, one of which guideways is seen in said Fig. 9 and both of which appear in Fig. 1. Each such guide member is further provided with a circular opening 32 at or about its midlength, of a size to receive or to encircle closely the main shaft 12. The guide members 30 are all alike, save that the two outermost members at opposite ends of the series have the guideway 31 in the inner face only. Spacing blocks 33 secured to or made integral with the guide members 30, serve to maintain the various members in proper position relatively to one another and to the other parts of the mechanism, the outermost guide members 30 being prevented by the gears 21 from moving toward the proximate extremity of the shaft.

To prevent any shifting or swinging of the guide members 30 about the shaft 12, the inner wall of cylinder 8 is formed with a longitudinal groove or channel 34 at the upper side to receive ribs or projections 35 on the upper ends or faces of the guide members 30 and spacing blocks 33, or either of them. Similar grooves 36 may also be provided in such inner face of the cylinder 8 to receive similar projections 37 on the lower ends of the guide members 30. (See Figs. 2, 8 and 9.) It will be seen that when two of the guide members 30 are placed upon shaft 12 with a cam 13 between them, the opposing faces of said guide members will, by reason of the guideways 31 in said faces, provide a guideway for both ends of a block or headpiece 38 of a stem 39. As seen in Fig. 1 there is a series of these stems 39, the number of said stems depending upon the highest sum which the machine is designed to print. The lower end of each stem 39 passes through and is guided in a hole 40 formed in the lower side of cylinder 8, as shown in Figs. 1 and 2. By this arrangement each stem 39 will be guided and caused to move in a straight line, the head 38 preventing any rotary movement of the stem about its axis.

Each stem 39 is encompassed by a helical spring 41, the upper end of which bears beneath the block or head 38, and the lower end of which rests upon the inner face of cylinder 8. The guideways 31 may be of such length as to permit the introduction of one end of each stem-head 38 into the guideway of the last previously introduced guide member 30 while the lower extremity of the stem is still wholly within the interior of cylinder 8, the stem and head being afterwards pressed down sufficiently to carry such lower end fairly into the hole or opening 40, or into the position indicated in Figs. 1 and 2. After this is done the cam 13 which is to actuate and depress said stem, being applied to shaft 12 while the stem-head is thus slightly depressed, will hold down the head and stem, but will make contact therewith and prevent its rising above its normal position just indicated. Successive guide members, stems and cams will be applied in like manner until the entire series is built up.

Where a particularly long printing block is to be used, two stems may be carried by one head as shown in Fig. 1 slightly to the right of the midlength of the series. It is of course practicable to introduce the heads 38 and afterward to pass the stems 39 inward through the openings 40, and to screw the upper or inner ends into the blocks or heads, or to pin the heads to the stems, both being previously perforated for that purpose. This mode of securing the heads is indicated in connection with the two stems attached to a single head as above mentioned. Any other usual or convenient mode of attachment may be adopted, or the stems and heads may be made integral.

Encompassing and capable of rotation or oscillation upon and about cylinder 8, is a series of type-carriers 42 of the construction best illustrated in Fig. 8. Each of these carriers comprises an outer ring or annulus 43 of considerably larger diameter than cylinder 8; a similar but smaller annulus 44 concentric with the first annulus and adapted to fit somewhat closely about cylinder 8 and to move freely thereon; and two wall members 45 and 46 extending from one annulus to the other, of which the wall 45 may be formed integral with the annuli 43, 44, or separately, as found expedient. The wall 46, however, is made separate or detachable from the other members as indicated, and may conveniently be struck up or die-stamped from sheet metal of suitable thickness. It is formed or provided with a radial arm 47 which may be given a 90 degree twist to produce a flat-faced finger-piece, as shown in Figs. 5 and 8. The periphery of this wall member 46 is formed with a series of alternate and approximately V-shaped elevations and depressions 48 and 49, for a purpose later explained.

The cylinder 8 has at its lower side a perforation 50 to receive or permit the passage through it of one of the stems 39 when pressed down by one of the cams 13. The wall member 46 is here shown of a diameter to fit snugly within the outer annulus 43, and its central opening is of a size closely to encircle the annulus 44, which latter is provided with a recess 51 to receive the arm 47 and is cut away through that portion occupied by the projections 48. When the wall member 46 is applied to the integral or the built-up structure, as the case may be, comprising annuli 43, 44, and wall member 45, there is produced an annular box, the annular chamber of which is of rectangular cross section.

The outer and inner annuli 43 and 44 are provided respectively with spaced holes 52 and 53, corresponding in number with the type blocks with which each type-carrier 42 is equipped, or with the number of digits and word or symbol blocks which the particular type-carrier is designed to print. Between the annuli 43, 44 of each type-carrier are parallel-walled guideways 54 produced by raised ribs or projections 55 of tapering form. These may be produced by milling or cutting the guideways in the inner faces of the walls, or by applying tapered blocks or plates thereto. Each guideway 54 extends equally on opposite sides of the radial axis of one or another of the pairs of holes 52, 53, and serves to receive the ends of the head or block 56 of one or another of a second series of radial stems 57, each encircled by a helical spring 58 and carrying at its outer end a type-block 59. The heads 56 of the respective stems 57, when the type-blocks 59 of the latter are brought to printing position, stand in axial alinement with and directly below the first or inner series of stems 39, which as above stated have their heads directly below and in contact with the cams 13 of main shaft 12. From this it follows that if the shaft 12 be turned, the cams 13 will bear upon the heads 38 of stems 39, pressing the latter downward, and causing their lower ends to bear upon the heads 56 of the stems 57 and to force the same downward toward the paper or check upon which they are to print.

The type-carriers being thus constructed and equipped, can be rotated or oscillated about the cylinder 8 by means of the finger-pieces at the ends of the radial arms 47, thereby carrying any one of the type-blocks 59 of any desired carrier to a position vertically over the printing point of the type of that carrier. This movement of the arms 47 is rendered possible by the formation in the upper and front portion of the shell or casing 3 of a series of parallel slots 60 lying in vertical planes, and through which said arms project. Proper positioning of each arm 47 to bring the desired type of its carrier to printing position is made convenient and certain by placing along one side, preferably the right-hand side of each slot 60, properly spaced indicia corresponding to the symbols and digits of the type-blocks of the carriers. As here shown in Fig. 5 these may conveniently run, symbol (to stand at left end of the line of printed digits), zero, and digits 1 to 9 inclusive, following in regular sequence downward. The arrangement of the type-blocks in each carrier will of course be in just the reverse order; that is to say, the lowermost block will bear the cross, star, or other symbol indicating the left-hand limit of the printing, followed by the cipher, and this by the digits 1 to 9 inclusive, upward in regular sequence.

To facilitate placing each carrier 42 in its adjusted position according to the printing block selected, and to retain it in such position, the sinuous peripheral portion of the wall member 46 of each carrier is provided, the notches or depressions 49 serving to receive a V-shaped lug 61 carried by a spring 62 secured at one end to the interior of the cylindrical body of the shell or casing 3, and by said spring held in plane with the projections and caused to seat itself in the notch brought beneath it by the positioning of the arm 47. The inclination of the faces of the projections 48 or walls of the depressions 49, and of the faces of the lug 61, is such that application of moderate force to the arm 47 will cause said projections 48 to ride beneath and lift the lug 61 and its spring 62, yet the force of the spring is sufficient when the arm is released to seat said lug in the recess beneath it, thereby accurately positioning and retaining in position the rotary type-carrier.

Each type-block 59 has its printing face provided with sharp blade-like ribs to mesh with corresponding ribs on a bar 63 supported beneath the check-receiving table or bed 64, as later described in detail.

To ink the type-blocks there is provided on the inner side of the closure-plate 5 and extending down to its lower edge, an ink reservoir 65 from which ink is carried by a suitable wick or wicks 66, the reservoir and wick extending practically from end to end of the casing 3, or a little more than the full length of the line of printing type. To apply the ink to and distribute it evenly over the type faces, I provide a horizontal roller 67 of felt, rubber, or other yielding material, which is normally held in contact with the outer or free edge of the wick 66, as seen in Figs. 2 and 4. On the side of the roller opposite the wick is a longitudinal brush 68, turned with the free ends of its bristles upward or in position to face the type-blocks.

The ink roller 67 has a central shaft or axle 69, to which the roller is secured to prevent independent rotation, the extremities of said shaft or axle extending from end to end of the interior of the casing and just clearing the end walls 10. The brush 68 is co-extensive with the roller 67, and is carried at each end by a link 70 pivotally attached to the lower ends of levers 71 carried at their upper ends by fulcrum screws 72 screwing into the end walls 10 of the casing, and provided with springs 73 tending to move the lower ends of the levers 71 and consequently the links 70, roll 67 and brush 68 toward the rear of the machine. The protruding ends of the ink-roll shaft or axle 69 rest and roll upon flat supporting springs 74 carried at their forward or outer ends by screws 75 entering tapped seats in the end walls 10 of the casing. Their inner or free ends rest upon studs 76 projecting inwardly from the end walls 10, as best seen in Fig. 4.

The springs 74 are preferably slightly bowed upward between their ends, the highest point being at a point in line with the row of printing type when the latter are adjusted to printing position, so that as the inking roller 67 and brush 68 move from their normal position indicated in Fig. 2, to their inward position indicated in Fig. 3, first the brush and then the roller will be carried into contact with and across the printing face of that type or those type which is or are at the time in printing position. In making their inward movement the brush tends to wipe and clean the face of the type, or free it from any dust, and the roll applies the ink, the roll being turned by reason of its contact with the faces of the type-blocks 59. On the outward or return movement, first the roller and then the brush pass back over the type on the printing line, both tending to smooth out and distribute the ink applied during the inward movement.

To effect the inward and outward movements of the brush and roll, the levers 71 which are curved at or about their midlength to conform substantially to the curvature of cylinder 8, are each provided with an inwardly projecting arm or extension 77, here shown as of V-form and dished or bent as indicated in Fig. 7. The inner extremity of each arm 77 carries a roller 78 turning about a stud-axle 79 screwed, riveted, or otherwise fastened to said arm, the roller projecting slightly beyond the arm to make contact with and roll upon the peripheral face of a cam 80 carried by shaft 12. Two such cams are employed, one near each end of said cam-shaft 12 and in plane with the roller 78 which is to bear against it. Each cam 80 is formed with a depression of V-shape, the walls of which are at an obtuse angle, thus permitting the cams during their rotation to press outward the rolls 78 and consequently the levers 71, said levers carrying with them the links 70, roll 67 and brush 68.

The normal position of the levers 71 is indicated by dotted lines in Figs. 2 and 3. When in that position the rollers 78 rest upon the circular peripheral portions of cams 80, or those portions most remote from the axis of the cam and shaft 12, and assume the position indicated in full lines in Fig. 3 as the crank-arm 14 is swung upward and toward the rear of the machine to actuate the cams 13 and depress the type-blocks. The brush 68 and roller 67 in their inward movement pass beyond the printing line but are at once retracted to normal position by reason of the form of the cam surfaces, and are there retained so that the descending type-blocks may clear them when moving to the face of the check or slip being printed. These movements of the levers 71 and attached parts are effected during each rotation of cam-shaft 12. To permit the arms 77 of levers 71 thus to move inward, openings 81 are formed in the forward wall of hollow cylinder 8 near the ends of the latter, the plans in which the arms 77, rolls 78 and cams 80 lie being made clear by Fig. 1. Similar openings 82 are made in the lower and rear side of cylinder 8 to permit the gears 22 to project into said cylinder, as seen in Fig. 3.

It is important that there be provided a level bed or support for the check, and that the portions with which the check contacts along the printing zones be capable of adjustment to ensure proper leveling of such support, or true parallelism between its upper face and the lower or printing faces of the type-blocks 59. To this end there is provided an adjustable bed-plate or frame 83, having raised ribs 84, 85, and 86 to receive and hold between them the bar 63 heretofore mentioned, and a second and preferably wider bar 87, both of which are provided on their upper faces with blade-like ribs, teeth, or the like, which, co-acting with like faces of the type-blocks and of other blocks 88 similarly fashioned, serve to slit or puncture the check lying between them, and thereby to make difficult erasure of matter printed, or subsequent printing or writing upon the surface in the event of attempted erasure. The character of the cutting or puncturing surfaces of the type-blocks 59 and of the blocks 88 may vary in accordance with existing practice, that is to say, any usual and approved cutting or puncturing surface may be employed.

As shown in Figs. 2 and 4, the bed-plate or frame 83 is provided at or near both ends with forwardly and rearwardly projecting arms 89, the extremities of said arms being perforated and tapped to receive adjusting screws 90, the upper ends of which are preferably swiveled in the top-plate of the base 1. By turning the screws 90 to the right or to the left, they will cause the arms 89 and consequently the frame or bed 83, to be raised or lowered at any one or more points as desired, and leveled to bring the upper faces of the ribs or bars 84, 85 and 86 into plane with the upper face of the check-receiving table 64. Beneath the bars 63 and 87 are placed screws 91 which also pass through tapped holes in the bed-plate 83, and bear at their upper ends against the under sides of said bars. These screws serve to elevate the bars 63 and 87, and to bring their upper faces in plane with the check-table 64. A second set of screws 92 passing freely through holes of slightly larger diameter formed in the bed-plate, enter threaded seats in the lower faces of the bars 63 and 87, the heads of said screws bearing against the under face of bed or plate 83. (See Fig. 1.) These screws 92 serve to limit the rise and to prevent displacement of the bars 63 and 87, and in connection with the screws 91 hold both bars firmly in adjusted position.

As the type-blocks 59, when set or adjusted for the printing of the check, always come to the same line or position, the co-acting slitting or puncturing bar 63 has a fixed position directly beneath the positioned type-blocks, except for the vertical adjustment above noted. The portions of the check in which the payee's name is to be written or printed, and that in which the sum-indicating figures are to be written by pen, are relatively spaced somewhat differently in different checks. It is hence desirable to provide means for adjusting forward or backward the movable slitting or puncturing blocks 88 which co-act with the fixed bar 87, said bar being made of such width as to co-act with the movable blocks in whatever adjustment may be given the latter. To this end the slitting or puncturing blocks 88 are carried at the outer end of longitudinally adjustable slide-blocks 93, movable in guides or ways formed in a bracket or carrier 94 fulcrumed on a rod 95 journaled at its ends in the end walls 10 of the casing 3. The form of these brackets or carriers 94 is shown in Figs. 1, 2 and 4, which respectively illustrate the same in end, side and top plan view.

Each carrier 94 is formed with a depending arm 96 near the fulcrum-rod 95, in which arm is swiveled a screw stem 97 provided with a milled head and having an elongated threaded stem in advance of the swivel. This stem screws into a tapped opening in the slide-block 93, which as mentioned carries the slitting or puncturing blocks 88. Each screw-stem 97 extends through an opening 98 in the rear wall of the casing 3 so that its milled head is located outside the casing, and may be turned to rotate the screw and thus to move forward and backward in its guideway the slide-block 93. Each carrier or bracket 94 has attached to it one end of a helical spring 99, the other end of which is attached to a rod or other fixed support 100, as best seen in Fig. 2, the spring exerting an upward pull upon the carrier or bracket and holding the upper face of its main body portion in contact with the cams 25 carried by the secondary cam-shaft 24.

It will be seen upon reference particularly to Figs. 1, 2 and 4, that upon turning or completely rotating shaft 24 the cams 25 will be caused to press downward the pivoted bracket or carrier 94, and with it the slitting or puncturing blocks 88 which, bearing upon the check 101 seen in Fig. 2, will force the same into firm contact with the bar 87, and co-acting with said bar will slit or puncture the check. The several blocks 88 are arranged in longitudinal alinement as shown in Figs. 1 and 4, and thereby act to slit or puncture all that portion of the check in which is written or printed the name of the payee and in which the amount of the check is usually written in figures with a pen (see Fig. 10). The number of slitting or puncturing blocks 88 may be greater or less as desired. It is preferred, however, in practice to use a plurality of such blocks, each with its separate actuating cam, and so to position the cams that they shall act in succession, thereby reducing the force necessary to be exerted by the operator in effecting the slitting or puncturing.

In order to insure the proper placing of the check preparatory to printing, and to bring the space for the payee's name and that for indication of the amount of the check, into proper relation to the slitting or puncturing blocks 88 and to the main printing type which in co-operation with bar 63 effect the slitting or puncturing of the portion of the check on which said type print, there is journaled in the base 1 of casing 3 a rockshaft 102 provided at one end and outside the casing with an arm 103. (See Fig. 6.) This arm 103 is pointed at its free end and furnished near said end with a knob 104 by which to swing it forward and backward over a graduated arc 105 carried at one end of the casing 3. As seen in Figs. 2 and 4, the rockshaft 102 carries within the casing a series of upstanding arms 106, alined with the arm 103 and extending upward through slots 107 formed in the top or bed-plate of casing 1 and in the check-receiving table 64. The pointer thus serves to indicate to the user the position of the arms 106, and to show at what point the top edge of the check will be arrested when slid inward beneath the printing type-carriers and over the check-receiving table.

The ends of the check may project beyond the ends of the base 1 and check-receiving table 64, owing to the fact that the lower edges of the end walls 10 of casing 3 are raised clear of the table 64 as best shown in Fig. 3, the cylindrical body of said casing being formed with a heavy rib 109 at its rear extending from end to end of said body. This rib is provided with tapped holes to receive substantial screws 110 passing upward through the bed plate or top of the base 1, and screwing into said tapped openings. In this way strong and adquate support is provided for the shell 3, its end walls 10 fitting within the cylindrical body of said shell and thus firmly bracing and supporting the same at the junction of the rib 109 with said body, and the rib affording a broad and adequate footing for the casing as a whole, when not an integral casting.

*Operation.*—The operation of the machine is simple and expeditious. The date, the name of the payee, and the amount of the check in figures will preferably be written with a pen, but may be typewritten if desired. This is done prior to introducing the check into the machine, in order that the portion of the check bearing the payee's name and the figures so written or typewritten shall be slitted or punctured at the time of printing the main amount-designation by the large type described. Thus prepared the check is inserted edgewise into the space between the check-receiving table 64 and the overhanging lower edges of the end walls 10, as shown in Figs. 2 and 3, and is moved inward until its top edge encounters and is arrested by the arms 106 properly adjusted to bring the written or typewritten portions of the check beneath the slitting or puncturing blocks 88, and the space for the main amount-designation beneath the type-blocks 59 which are to do the printing of such designation. One end of the check may, if desired, be positioned by a guide or gage, as is common in check-writers, typewriters, and various other structures, or brought to a guide line marked on the upper face of the check-receiving table 64, as is also quite usual.

The amount of the check being noted, as also the column in which the first or extreme left-hand figure of such amount is to be printed, the finger-piece of the type-carrier next to and at the left of said first figure column is swung forward to bring the lowermost type-block of said carrier to the printing point, which in the embodiment here shown stands vertically beneath the axis of main shaft 12. This lowermost block bears the symbol indicating the outside limit of the printed indication of amount, so that when printed on the check this symbol shall preclude the placing of any other digit in advance of those about to be printed and constituting the indication of amount. Successive arms 47 are similarly moved forward until opposite the spaces on the strips 108 bearing digits or symbols corresponding to those of the type-blocks which it is desired to bring to the printing point, each type-carrier from left to right being arrested and held in its adjusted position by the V-shaped lug 61 springing into the depression 49 brought beneath it under such adjustment of the type-block. After the last arm 47 falling within the dollars space has been positioned, the next arm to the right is moved forward to bring down to the printing point the longer block bearing the word "Dollars". The next two arms to the right are then similarly operated to bring down in succession the type-blocks bearing the digit or digits which together indicate the number of cents, or a cipher or ciphers if these be appropriate; and finally, the arm 47 at the extreme right is operated to bring to printing position the type-block bearing the word "Cents" or an abbreviation thereof. In this way the type-blocks are alined directly over the printing space in the check, and vertically below the main shaft 12, ready to be forced downward into printing contact with the face of the check.

The operator then grasps the handle 15 of the crank-arm 14, and pressing upon the knob of wedge-block 18 forces the same inward and thereby withdraws the retaining bolt 16 from its seat, thus freeing the arm 14 and permitting it to be swung in a circular path about the axis of shaft 12 in an upward and rearward direction, or clockwise as viewed from the crank-bearing end of the machine. As the shaft 12 is rotated in a clockwise direction, the cams 13 carried by said shaft bear in succession upon the blocks 38 of the stems 39 beneath the shaft, forcing the same radially outward or downward, causing said stems in turn to bear upon the head-blocks 56 of stems 57 carrying the type-blocks 59, and thereby forcing downward the positioned and alined type-blocks into contact with the face of the check and impressing upon the check the digits, symbols, words and abbreviations carried by said type-blocks.

The type-blocks are inked during the initial part of the descent of said stems, owing to the bringing of the depressions of cams 80 opposite the rollers 78 of levers 71, which levers carry the inking roller 67 and brush 68 inward beneath and in contact with the printing faces of the type-blocks owing to the force exerted by spring 73 upon said levers 71. The ink-roll and brush are returned to normal position almost immediately by further rotation of cams 80, and before the type-blocks 59 are sufficiently lowered to collide with them. The depressions of cams 80 having performed their function, do not again come opposite the rollers 78 and hence do not again function until the commencement of another revolution of handle 15 and rotation of shaft 12.

Forward or clockwise rotation of crank-arm 14 serves also, through the medium of gears 21, 22 and 23, to rotate the secondary shaft 24 simultaneously with and in the same direction as shaft 12, and thereby to cause the cams 25 of shaft 24 to depress the carriers 94 and with them the cutting or puncturing blocks 88, thus slitting or puncturing those portions of the check occupied by the name of the payee and the smaller figures written in by the drawer of the check. The cams 13 and 25, being set at varying angular relation to the axes of shafts 12 and 24, act progressively upon the respective stems and carriers, so that the force required to actuate the type-blocks and the slitting or puncturing blocks 88, is materially less than would be necessary to exert full pressure on all simultaneously.

As the handle 15 is carried through one complete revolution, the cams 13 of the main shaft 12 act upon the radial stems 39 and the alined stems 57 to force the latter outward and effect the printing of the type which they carry, the cams 13 riding in succession off the head-blocks 38 of stems 39 which, as well as the alined stems 57, are immediately moved inward to normal position by the springs 41. The slitting or puncturing blocks 88 are similarly depressed in succession and relieved of pressure, by the simultaneous rotation of the secondary shaft 24 and its cams 25.

As previously noted, the type-blocks which print the main amount-designation are of very large size, facilitating the reading of the figures printed by them upon the check, and also rendering practicable the formation of slitting blades or puncturing points, whereby the blocks are enabled or caused in the act of making their impression upon the check, to slit or puncture the same and carry the ink into the slits or perforations so made. In this way an unusually legible check is produced, guarded against alteration in any way by the slitting or puncturing and the carrying of the ink into the incisions. The slitting or puncturing of the printed surface simultaneously with or in the act of printing the check is not only peculiarly effective in carrying the ink into the slits or openings made, but dispenses with a separate and subsequent slitting or puncturing of the printed surface in and by another machine or device.

The check so printed is further made definite and safe against change by reason of the printed names of the respective digits or combinations, thereof, and of the further designations of "Thousands", "Hundreds", etc., and of "Dollars" and "Cents", in the manner which may now be best explained by referring to Fig. 10 showing a check printed in accordance with this invention. As seen in said figure, the amount which the check calls for is seventy-five thousand three hundred twenty-seven dollars and twenty-nine cents. Two spaces are allotted to digits indicating cents, and as cents fall to the right of the decimal point in the ordinary writing of a check, as shown in the small figure designation in Fig. 10, the digits printed in the right-hand cents space will represent hundredths of a dollar, or cents up to and including nine, while the digits printed in the left-hand space will indicate tenths of a dollar from one up to and including nine. The digits printed in the hundredths space will be read alone when a cipher is printed in the tenths space, hence the simple name of each digit of the hundredths series will be associated with it. The digits printed in the tenths space are, however, to be read in connection with the cipher or digit printed in the hundredths space, and hence will be designated by the derivatives of their names indicating multiplication by ten, i. e., "Twenty", "Thirty", etc., up to and including "Ninety". Any two digits and their names, read together, will accordingly indicate the amount in cents, "Twenty-nine cents" being printed on the check represented in Fig. 10. As the word "Cents" is, in the present machine, printed immediately to the right of the hundredths space, it may be and preferably is omitted from the digit types of the two series assigned to cents, permitting said digits to be of full size.

To the left of the cents spaces is printed the word "Dollars", indicating that all numerals preceding said word represent dollars. The printing of the word "Dollars" in full, and widely separating cents and dollars in the sum printed on the check, thus avoids possible misreading of the figures, which is liable to occur where the dollars and cents in a figure designation are separated solely by the decimal point. As the dollar is the unit of the sum written to the left of the word "Dollars", the digits in the first space to the left of said word are designated by their proper names, as in the case of the digits in the hundredths series indicating cents, and the digits of the tens series above 1 are designated by derivatives of their names, as "Twenty", "Thirty", "Forty", to and including "Ninety", the same as the tenths digits of the cents series. The third space to the left of the word "Dollars" is assigned to hundreds, and the fourth space to thousands, and these words "Hundreds" and "Thousands" are placed under the digits of the hundreds and thousands series, while the proper names of the respective digits appear above them. In the fifth space to the left of the word "Dollars" are printed tens of thousands; in the sixth space, hundreds of thousands; and in the seventh, millions, the same mode or principle of indicating the names of the digits and their value being carried out throughout the several series of digits, up to whatever amount the check-writer is equipped to print. It is unnecessary to repeat what is sufficiently explained by the series above considered.

In advance of the space which is to receive the first or extreme left-hand digit of the dollars designation, is printed a suitable symbol, as a star, cross, or the like, showing that the printing line commences to the right of the point occupied by such symbol, and thus guarding against raising the check by printing in one or more digits ahead of the first numeral which originally or properly appeared on the check.

The words "Thousands", "Hundreds", and the like, where associated with the digits, are advisably abbreviated as "Thous.", "Hund.", etc., to the end that the letters may be as large and legible as practicable. Abbreviation may also, in some cases, be necessary or expedient in regard to the names of the digits, and the word "names" as used in this specification is to be understood as meaning or comprehending both the full name and any suitable abbreviation thereof.

Various details of the machine are susceptible of embodiment in different forms, or of replacement by equivalents, and the specification and the claims are to be read with that understanding. In the drawings I have shown the groups of digits in connection with which the arms 47 are to be adjusted, engraved or impressed on the metallic strips 108 secured to the body of the shell or casing and to the removable section 4 thereof by screws or other fastenings, it being cheaper and more convenient to produce these digits or indicia on such separate strips than to cast or otherwise form them in or on the body of the casing itself. The manner of indicating the digits may, however, be varied at will within the modes already known for doing such work.

Where springs are used as in the parts 62, 73 and 99, the form or type of spring is obviously immaterial, and any spring of usual type capable of convenient application in the places indicated may of course be employed instead of the particular type illustrated.

Throughout the machine such changes as fall within the province of the mechanic, designer or engineer may be made with a view to greater convenience or economy of production and assembling, without departing from the spirit of my invention or the scope of the claims, provided the principles and mode of operation set forth are retained.

What is claimed is:—

1. A check-writer comprising a base; a substantially open-ended shell provided at its rear side with a longitudinal rib to rest upon said base; securing means for holding said shell rigidly in place upon the base; end walls fitting within and attached to the shell, resting at their rear lower portions upon the rib of the shell, and overhanging but raised slightly above the shell from the rib toward the forward side of the base; and a hollow cylinder within and concentric with the shell and secured at its ends to the end walls of the casing; whereby a strong and rigid casing is produced and supports are afforded for the mechanism of the check-writer.

2. A check-writer comprising a base; a main shell provided with end walls; an inner hollow cylindrical shell connecting said end walls; a shaft within said inner shell, provided with a series of cams; spring-supported stems mounted in stationary guides within the inner shell in vertical plane with the respective cams; type-carriers mounted upon and rotatable about said inner shell, each carrier provided with means by which to rotate it and with a series of radial guideways, each guideway containing a type-stem bearing at its outer end a type-block and at its inner end a head, and each encircled by a spring tending to move the type-stem radially inward, the stems of the type-carriers serving to bring any type-block of any carrier into alinement with the spring-supported stems of the inner shell; and means for rotating the main cam-shaft and thereby moving radially outward the positioned type-blocks 3. In a check-writer comprising a shell or casing, an inner fixed hollow cylindrical shell, a shaft provided with cams, and stems radially movable in fixed guides through rotation of said shaft and cams; a series of type-carriers, each of annular form and provided with radial guideways, each guideway containing a type-stem provided at its outer end with a type-block and at its inner end with a head to receive the pressure of the stems of the inner shell when the cam-shaft is turned; and a supporting bed for the check to be printed.

4. In a check-writer of the character described, a casing; a fixed cylindrical shell therein provided with guideways; radially movable actuating stems in said guideways; type-carriers of annular form encircling said inner shell and each provided with a series of radial guideways; type-stems radially movable in said guideways, each provided at its outer end with a type-block, said carriers being each provided with means for positioning any selected type-bearing stem in alinement with an actuating stem of the inner shell; and means for forcing out the alined actuating and type-bearing stems.

5. A check-writer comprising, in combination, a base affording support for the check to be writen; a shell or casing carried by and overhanging said base; a shaft journaled in bearings in the walls of the casing and provided with a series of cams; an inner tubular shell; fixed guideways within said inner shell; radially movable stems arranged within said guideways; springs for pressing said stems inward against the cams; a series of oscillatable type-carriers, each provided with a series of radial guideways and with radial type-bearing stems movable in said guideways and encircled by springs tending to push said stems radially inward, each type-carrier being further provided with a finger-piece whereby it may be oscillated to bring any selected type-block to printing position; inking devices for applying ink to the faces of the type-blocks; and means for rotating the cam-shaft and thereby forcing outward the actuating stems and the type-bearing stems alined therewith, to effect a printing of the check.

6. In a check-writer of the character described, a bed or support for the check to be written; an overlying shell or casing; a series of independently oscillatable type-carriers, each provided with a series of radially movable type-bearing stems, each stem having at its end a type-block, said carriers being each further provided with an actuating stem whereby it may be moved to bring any selected type to printing position; a shaft provided with a series of cams, each cam in plane with the type-bearing stems of one or another of the type-carriers; radially movable stems intermediate said cams and the positioned type-bearing stems; fixed guides for said intermediate stems; and means for turning said shaft to press outward the intermediate stems and through them the positioned type-stems.

7. A check-writer of the character described, comprising a series of rotatable type-carriers, each carrier provided with radial guideways and with radially movable stems having type-blocks at their outer ends; a fixed series of guideways in plane with the radial type-stems, each such guideway containing a radially movable actuating stem; a rotatable cam-shaft; and a series of cams carried by said shaft, in plane with one of the actuating stems, and serving by pressure upon its associated stem to force outward the same and the alined type-bearing stem.

8. A check-writer of the character described, comprising a supporting base; a series of type-carriers provided with radially movable type-bearing stems, each carrier movable to bring a selected one of its type-blocks to printing position; a shaft provided with cams for moving the positioned type-blocks radially to the printing point; and spring retracted stems intermediate the cams and the type-bearing stems, said cams being set in spiral order about the shaft, whereby they are caused to act successively upon the intermediate stems and through them upon the positioned type-bearing stems and thus to minimize the force at any instance required in projecting the positioned type-blocks into printing contact with the check to be printed.

9. In a check-writer of the character described, an annular type-carrier comprising outer and inner annuli 43 and 44 provided respectively with perforations 52 and 53 in radial alinement; walls 45 and 46, the latter provided with an outwardly projecting arm, both of said walls having guiding channels 54 in their inner faces; type-bearing stems 57 provided at their upper ends with guiding heads 56 and at their outer ends with type-blocks 59; and springs 58 encircling the stems 57, bearing at their inner ends against the guiding heads 56 and at their outer ends against the inner face of the annulus 43.

10. A check-writer comprising, in combination, a bed or check support; a series of oscillatable type-carriers, each bearing a plurality of printing type and movable about a common support to bring any selected one of its type to printing position; a shaft journaled in bearings in the frame of the check-writer and provided with a series of cams; a series of stems arranged in common plane directly over the printing line of the type and movable by the cams against and with the type-stems to project the positioned type into contact with the check or surface to be printed; and means for rotating said cam-shaft.

11. In a check-writer of the character described, and in combination with a series of oscillatable type-carriers, a series of type blocks for each carrier, each block having a stem guided and movable in such carrier; a cam-carrying shaft and devices intermediate its cams and the type-block stems for forcing outward the stems of the positioned type-blocks of said carriers; inking mechanism, comprising a stationary ink reservoir, an absorbent wick projecting therefrom, an ink roller lying normally in contact with the longitudinal edge of said wick and journaled in links connected at one end by a brush having a rigid back or bar, the ends of the roll journals lying upon and supported by yielding guides, levers fulcrumed at their upper ends, pivotally connected at their lower ends to the roll-supporting links, and each having intermediate its ends a roller, springs tending to move said levers and the connecting roller inward, and cams fashioned to hold said levers normally in their outward position but to permit them to move inward under the stress of their springs and then to return to normal position before the printing type descend to printing level; whereby the roller is caused to apply ink to the printing faces of the positioned type, and the brush is caused to distribute or spread the ink evenly over the face of the type and to remove any excess.

12. In a check-writer of the character described, a bed or support for the check to be printed; type-carriers, each provided with a series of type and movable to bring to printing position a type of each of several carriers; a cam shaft about which the carriers are movable to bring appropriate type to printing position and into alinement with one another; radially movable stems in axial alinement with the stems of the type when said type are in printing position; and cams carried by the cam shaft, set in progressively varying angular position about said shaft and serving to act upon the radially movable stems in succession, and thereby to force the several positioned type successively into printing contact with the check.

13. In a check-writer of the character described, a bed or support for the check to be printed; a series of blocks overhanging the check-supporting bed, each block having its lower face provided with cutting or slitting members; a co-acting slitting or cutting bar beneath said blocks; a rotatable shaft; and cams carried by said shaft and positioned to successively depress the several blocks and force them into contact with a check upon the supporting bed and into cutting or slitting relation with the co-acting bar beneath the check.

14. In a check-writer of the character described, a check-supporting bed; a series of oscillatable type-carriers, each provided with a plurality of radially movable stems, each stem bearing a type-block; a shaft provided with cams and serving when turned to force positioned type-blocks of different type-carriers into printing contact with a check lying upon said bed; a bar carried by said bed and having a cutting or perforating face at or about the level of said bed; a plurality of cutting or perforating blocks overlying said bar and slightly above the level of a check placed upon the bed; pivoted carriers or supports, one for each such block; a shaft overlying said carriers and provided with cams, one for each carrier; and intermediate connections between said shafts whereby the two are caused to turn in unison.

15. In a check-writer of the character described, a check-supporting bed; a series of oscillatable type-carriers, each provided with a plurality of radially movable stems, each stem bearing a type-block; a shaft provided with cams and serving when turned to force positioned type-blocks into printing contact with a check lying upon said bed; a bar carried by said bed and having a cutting or perforating face at or about the level of said bed; a plurality of cutting or perforating blocks overlying said bar and slightly above the level of a check placed upon the bed; pivoted carriers or supports, one for each such block; a shaft overlying said carriers and provided with cams, one for each carrier; gears carried by the respective cam-shafts; and an idler intermediate said gears for transmitting motion from one to the other and causing said cam-shafts to turn in unison.

16. In a check-writer of the character described, a check-supporting bed; a relatively wide bar provided with cutting or perforating ribs on its upper face at or about the level of the bed; means for varying the level of said bar; a relatively narrow block overlying said bar and similarly provided with cutting or perforating ribs facing those of the bar; a pivoted carrier for said block, comprising two parts one longitudinally adjustable relatively to the other whereby the block may be adjusted widthwise of the underlying bar to co-act with different portions thereof; and means for adjusting the sliding block-carrying section relatively to the main body of the carrier.

17. In a check-writer of the character described, a check-supporting bed; a relatively wide bar provided with cutting or perforating ribs on its upper face at or about the level of the bed; means for varying the level of said bar; a relatively narrow block overlying said bar and similarly provided with cutting or perforating ribs facing those of the bar; a pivoted carrier for said block comprising two parts one longitudinally adjustable relatively to the other, whereby the block may be adjusted widthwise of the underlying bar to co-act with different portions thereof; and a screw swiveled in one of said parts of the carrier and having its threaded portion seated in a correspondingly tapped hole in the other part of said carrier, and serving to adjust the movable part relatively to the fixed part.

18. In a check-writer of the character described, a check-supporting bed; a relatively wide, normally fixed slitting or perforating bar having its effective face at or about the level of said bed; an overlying, relatively narrow co-operating block having a co-acting slitting or perforating face opposed to that of said bar; a carrier for said block, adapted to rise and fall relatively to the slitting bar; means for adjusting the upper block forward or backward relatively to the fixed lower bar; means for depressing said carrier; and means for elevating said carrier and holding it normally in elevated position.

19. In a check-writer of the character described, a check-supporting bed; a relatively wide bar provided with cutting or perforating ribs on its upper face at or about the level of the bed; means for varying the level of said bar; a relatively narrow block overlying said bar and similarly provided with cutting or perforating ribs facing those of the bar; a rising and falling carrier for said block, comprising two parts one longitudinally adjustable relatively to the other; means for effecting such relative adjustment; means for depressing the carrier; means for normally elevating the carrier; and an adjustable stop for the upper edge of the check, serving to determine the position of that portion of the check to be slitted or perforated by the slitting bar and block.

20. A check-writer comprising printing type and mechanism for moving said type into contact with the face of a check, each digit type of the series which respectively print hundreds, thousands, millions or billions of dollars having immediately associated and adapted to print with it the name of the digit and the word indicating the value of the digit in the place to which such digit is assigned and in which it is to be printed upon the check.

21. In a check-writer of the character described, the combination of a base having a check-supporting bed provided with an opening extending through a considerable portion of the length of the bed; a frame located beneath the bed and provided with seats for two slitting or perforating bars, one relatively wider than the other; means for raising and lowering, leveling, and securing said frame and its slitting bars at any desired adjustment; co-acting slitting or perforating type blocks overlying and normally held clear of said bed; a bracket or carrier pivotally mounted in the main frame of the machine; a slide-block longitudinally adjustable in ways in said bracket and provided with a slitting or perforating block; a screw swiveled in an arm of said bracket and entering a correspondingly threaded opening in the longitudinally adjustable slide-block for adjusting its slitting or perforating block to different positions in the width of the relatively wider, lower slitting or perforating bar; and means for forcing the upper slitting members into slitting or perforating relation to the lower slitting members of the bed.

In testimony whereof I have signed my name to this specification.

JOHN J. DUFFIE.